United States Patent
Taoyama et al.

(10) Patent No.: US 7,627,653 B2
(45) Date of Patent: *Dec. 1, 2009

(54) METHOD AND APPARATUS FOR DISTRIBUTING COMPUTER FILES ACROSS A NETWORK

(75) Inventors: Minoru Taoyama, San Francisco, CA (US); Arthur Truong, Fremont, CA (US)

(73) Assignee: Apple Inc., Cupertino, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 11/959,717

(22) Filed: Dec. 19, 2007

(65) Prior Publication Data

US 2008/0109533 A1    May 8, 2008

Related U.S. Application Data

(63) Continuation of application No. 10/453,278, filed on Jun. 2, 2003, now Pat. No. 7,328,256.

(51) Int. Cl.
G06F 15/16 (2006.01)
G06F 9/46 (2006.01)

(52) U.S. Cl. ................. 709/219; 709/205; 718/105
(58) Field of Classification Search ............... 709/219
See application file for complete search history.

(56) References Cited

U.S. PATENT DOCUMENTS

| | | | |
|---|---|---|---|
| 5,878,228 A | 3/1999 | Miller et al. | |
| 6,256,673 B1 | 7/2001 | Gayman | |
| 6,510,467 B1 | 1/2003 | Behfar et al. | |
| 6,954,852 B2 | 10/2005 | Burokas et al. | |
| 2001/0034788 A1 | 10/2001 | McTernan et al. | |
| 2002/0129159 A1 | 9/2002 | Luby et al. | |
| 2003/0147369 A1* | 8/2003 | Singh et al. | 370/338 |
| 2003/0206549 A1* | 11/2003 | Mody et al. | 370/390 |
| 2003/0208675 A1* | 11/2003 | Burokas et al. | 713/1 |
| 2003/0212992 A1 | 11/2003 | Ronning et al. | |
| 2003/0236864 A1 | 12/2003 | Lai | |
| 2004/0010567 A1 | 1/2004 | Moyer et al. | |
| 2004/0039834 A1 | 2/2004 | Saunders et al. | |
| 2004/0117459 A1 | 6/2004 | Fry | |
| 2004/0168052 A1 | 8/2004 | Clisham et al. | |

* cited by examiner

Primary Examiner—William C Vaughn, Jr.
Assistant Examiner—Joiya M Cloud
(74) Attorney, Agent, or Firm—Park, Vaughan & Fleming LLP; Edward J. Grundler

(57) ABSTRACT

One embodiment of the present invention provides a system for distributing files across a network. During operation, the system receives a request at a server to download a file to a client. If the server is not currently downloading the file, the system commences a download stream for the file on a multicast port. If the server is currently downloading the file, the system remembers a marked location on the file, wherein the marked location relates to a current packet number of the download stream on the multicast port. The system then continues downloading the file until the end of the file, thereby allowing the client to receive the remainder of the file. Next, the system downloads the file from the beginning of the file to the marked location, thereby allowing the client to receive previously transmitted portions of the file.

18 Claims, 2 Drawing Sheets

METHOD AND APPARATUS FOR DISTRIBUTING COMPUTER FILES ACROSS A NETWORK

RELATED APPLICATION

This application is a continuation of a pending U.S. patent application, entitled "METHOD AND APPARATUS FOR DISTRIBUTING COMPUTER FILES ACROSS A NETWORK," by inventors Minoru Taoyama and Arthur Truong de la Cueva, having Ser. No. 10/453,278 and a filing date of 2 Jun. 2003. This application hereby claims priority under 35 U.S.C. § 120 to the above-listed patent application. Moreover, the above-listed application is hereby incorporated by reference.

BACKGROUND

1. Field of the Invention

The present invention relates to the process of distributing files to computer systems. More specifically, the present invention relates to a method and an apparatus for efficiently distributing computer files from a server to multiple clients across a network.

2. Related Art

Modern computing systems make use of many types of files, such as operating system executables, application program executables, and data files. A computer system manufacturer typically loads a core group of these files into the computing system's file storage area prior to delivering the computing system. Note that some of these files can be subsequently replaced to upgrade features, or to correct errors in the files.

Until recently, files have predominantly been distributed through a physical storage medium, such as a disk or a tape. However, as computer systems become more networked, it is becoming increasingly common to distribute files across a network. Distributing computer files across a network eliminates the manual labor required to take physical media from one computer to the next to download the files.

Unfortunately, distributing files across a network also presents problems. For example, loading files onto new computer systems in a factory can require considerable resources because there may be thousands of computer systems that require initial loads nearly simultaneously. Loading files onto these computer systems typically requires that a separate session be established between a file server and each computer system. Each additional session divides the available bandwidth and slows the distribution of files in the other sessions, thereby reducing throughput. Note that although using additional servers can increase overall throughput, using additional servers also greatly increases cost.

In another example, a manufacturer may distribute an update to a computer file across a network, such as the Internet. In this case, thousands of computer owners may attempt to download the update nearly simultaneously. As in the example above, each additional session dilutes the throughput of the server and slows the download process. To remedy this problem, many manufacturers mirror the update on several servers to maintain an acceptable download rate. While providing mirror servers can increase throughput, providing mirror servers is also very expensive, and the downloading process still remains fairly slow.

Hence, what is needed is a method and an apparatus for distributing computer files across a network without the problems described above.

SUMMARY

One embodiment of the present invention provides a system for distributing files across a network. During operation, the system receives a request at a server to download a file to a client. If the server is not currently downloading the file, the system commences a download stream for the file on a multicast port. If the server is currently downloading the file, the system remembers a marked location on the file, wherein the marked location relates to a current packet number of the download stream on the multicast port. The system then continues downloading the file until the end of the file, thereby allowing the client to receive the remainder of the file. Next, the system downloads the file from the beginning of the file to the marked location, thereby allowing the client to receive previously transmitted portions of the file.

In a variation of this embodiment, if the server receives an additional request from a second client to download the file, the system updates the marked location in the file to the current packet number in the download stream. The system then continues to download the file until the end of the file, thereby allowing the second client to receive the remainder of the file. Next, the system downloads the file from the beginning of the file to the marked location, thereby allowing the second client to receive previously transmitted portions of the file.

In a further variation, when the system receives a notice from the client at the server that a specified packet was not received, the system inserts the specified packet into the download stream.

In a further variation, if notices are received from multiple clients that the specified packet was not received, the system inserts the specified packet into the download stream only once to satisfy the notices.

One embodiment of the present invention provides a system for receiving files across a network. The system operates by sending a request from a client to a directory server for a network address for a file server. In response to the request, the client receives an address for the file server and a multicast address for a file stream. The client then requests a download of the file from the file server and subsequently receives the file stream at the multicast address.

In a variation of this embodiment, the client remembers the number of the first received packet in the file stream. If the first received packet is not the first packet in the file stream, the client reserves space in a local file for the previously transmitted portions of the file—from the first packet in the file up to the first received packet in the file stream. The client then receives and stores data from the file stream into the local file. When the end of the file stream is reached, the client continues to receive and to store the previously transmitted portions of the file from the first packet in the file up to the first received packet.

In a further variation, if a missing packet is detected in the file stream, the client sends a retry request to the server to resend the missing packet. The client then monitors the file stream for the missing packet. If the missing packet is received, the client stores the missing packet in the local file. Otherwise, the client resends the retry request to the file server after a specified period of time has elapsed.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Clients and Servers

Figure 1:
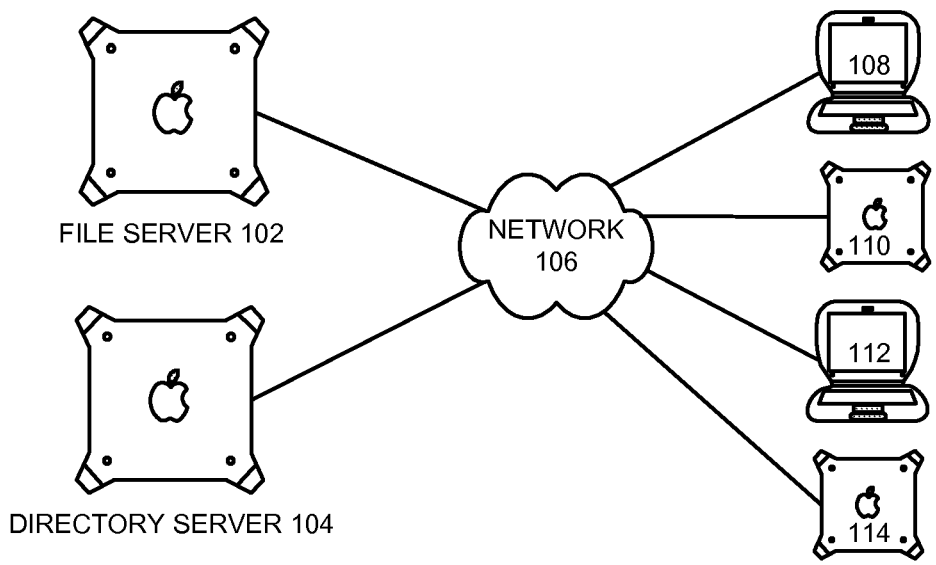
FIG. 1 illustrates clients and servers coupled to a network in accordance with an embodiment of the present invention.

FIG. 1 illustrates clients and servers coupled to a network in accordance with an embodiment of the present invention. The system includes file server 102, directory server 104, and clients 108, 110, 112, and 114 all coupled to network 106.

File server 102 and directory server 104 can generally include any nodes on a computer network including a mechanism for servicing requests from a client for computational and/or data storage resources. Specifically, file server 102 provides data storage and download capabilities to clients 108, 110, 112, and 114, while directory server 104 provides a locator service for file server addresses and download stream addresses. These addresses can be any acceptable network addresses such as Internet Protocol (IP) addresses. Note that the system can include more than one file server. Also note that directory server 104 can be implemented as a separate process running within file server 102.

Network 106 can generally include any type of wire or wireless communication channel capable of coupling together computing nodes. This includes, but is not limited to, a local area network, a wide area network, or a combination of networks. In one embodiment of the present invention, network 106 includes the Internet. Network 106 couples file server 102, directory server 104, and clients 108, 110, 112, and 114 together to provide communication paths for file downloads and other communications.

Clients 108, 110, 112, and 114 can generally include any node on a network including computational capability and including a mechanism for communicating across the network. During operation, a client, for example client 110, initially communicates with directory server 104 across network 106 to determine a network address for file server 102 and a network address for a particular data stream provided by file server 102. Client 110 then contacts file server 102 and requests a download of a particular file. Note that a file can include an executable file, a configuration file, and/or a data file. In response to this request, file server 102 provides the file to client 110. This process is described in more detail below in conjunction with FIGS. 2-4. Note that each client operates in a manner substantially identical to client 110; therefore the operation of clients 108, 112, and 114 will not be discussed further herein. Also note that there can be more or fewer clients than are shown in FIG. 1.

File Server

Figure 2:
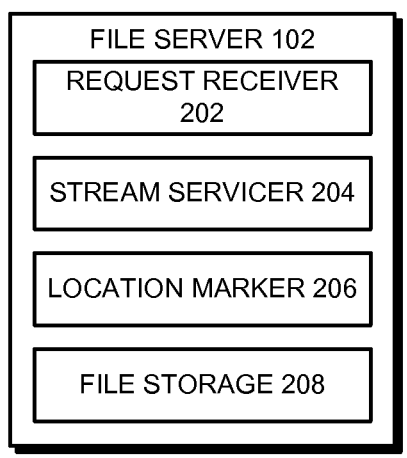
FIG. 2 illustrates a file server in accordance with an embodiment of the present invention.

FIG. 2 illustrates a file server 102 in accordance with an embodiment of the present invention. File server 102 includes request receiver 202, stream servicer 204, location marker 206, and file storage 208. During operation, request receiver 202 receives requests from clients such as clients 108, 110, 112, and 114 to provide a download of a file. In response to a request for a file, stream servicer 204 determines if the file is already being downloaded in a file stream. If not, stream servicer 204 accesses the file from file storage 208 and commences a download stream of the file on a multicast port.

If the file is already being downloaded in a file stream, location marker 206 marks the location within the file that is currently being downloaded in the file stream. When stream servicer 204 reaches the end of the file, stream servicer 204 continues to download the file from the beginning of the file to the location marked by location marker 206. Note that this process continues until no more requests for the file are received and the file has been completely downloaded to the last client to make a request. Also note that hundreds or thousands of clients can receive downloads from a single file stream with full bandwidth for each client.

Request receiver 202 also receives requests from clients requesting a retry for a particular packet, which has been dropped or not received by the client. In response to these requests, stream servicer 204 inserts the dropped packet into the file stream.

Note that many retry requests for the same packet can arriver nearly simultaneously. In this case, stream servicer 204 inserts one copy of the missing packet into the file stream and clears any outstanding requests for that packet. If additional requests for the same packet arrive subsequently, stream servicer 204 will again insert the packet into the file stream.

File storage 208 includes the files that are available to file server 102 for download. File storage 208 can include any type of system for storing data in non-volatile storage. This includes, but is not limited to, systems based upon magnetic, optical, and magneto-optical storage devices, as well as storage devices based on flash memory and/or battery-backed up memory.

Clients

Figure 3:
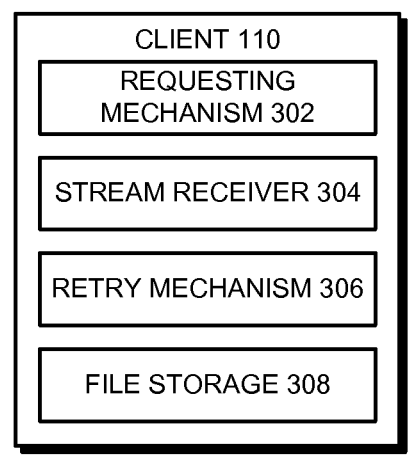
FIG. 3 illustrates a client in accordance with an embodiment of the present invention.

FIG. 3 illustrates a client 110 in accordance with an embodiment of the present invention. Client 110 is representative of each client within the system and therefore the operation of only client 110 will be provided herein. Client 110 includes requesting mechanism 302, stream receiver 304, retry mechanism 306, and file storage 308. During operation, requesting mechanism 302 first establishes communication with directory server 104 and requests the server address and the stream address for a particular file. Once these addresses have been provided, requesting mechanism 302 contacts file server 102 to request download of the file.

Stream receiver 304 receives the incoming file stream from file server 102. Note that the file stream may or may not start at the beginning of the file. If the file stream starts from the beginning of the file, stream receiver 304 stores the file in file storage 308.

If, however, the file stream does not start at the beginning of the file, stream receiver 304 allocates space within file storage 308 for the previously transmitted portions of the file. Stream receiver 304 then stores the remainder of the file within file storage 308. After file server 102 has reached the end of the file, file server 102 continues to send the file from the beginning of the file up to the first packet received by stream receiver 304 as described above in conjunction with FIG. 2. Stream receiver 304 stores the data in the allocated space within file storage 308.

Retry mechanism 306 monitors the packets in the received file stream. If retry mechanism 306 detects a missing packet, retry mechanism 306 sends a request to file server 102 to resend the missing packet. Retry mechanism 306 then continues to monitor the incoming file stream for the missing packet. If the missing packet is not received within a specified period of time, retry mechanism 306 again requests file server 102 to resend the missing packet.

File storage 308 includes storage for the file being downloaded from file server 102. File storage 308 can include any type of system for storing data in non-volatile storage. This includes, but is not limited to, systems based upon magnetic, optical, and magneto-optical storage devices, as well as storage devices based on flash memory and/or battery-backed up memory.

Downloading a File

Figure 4:
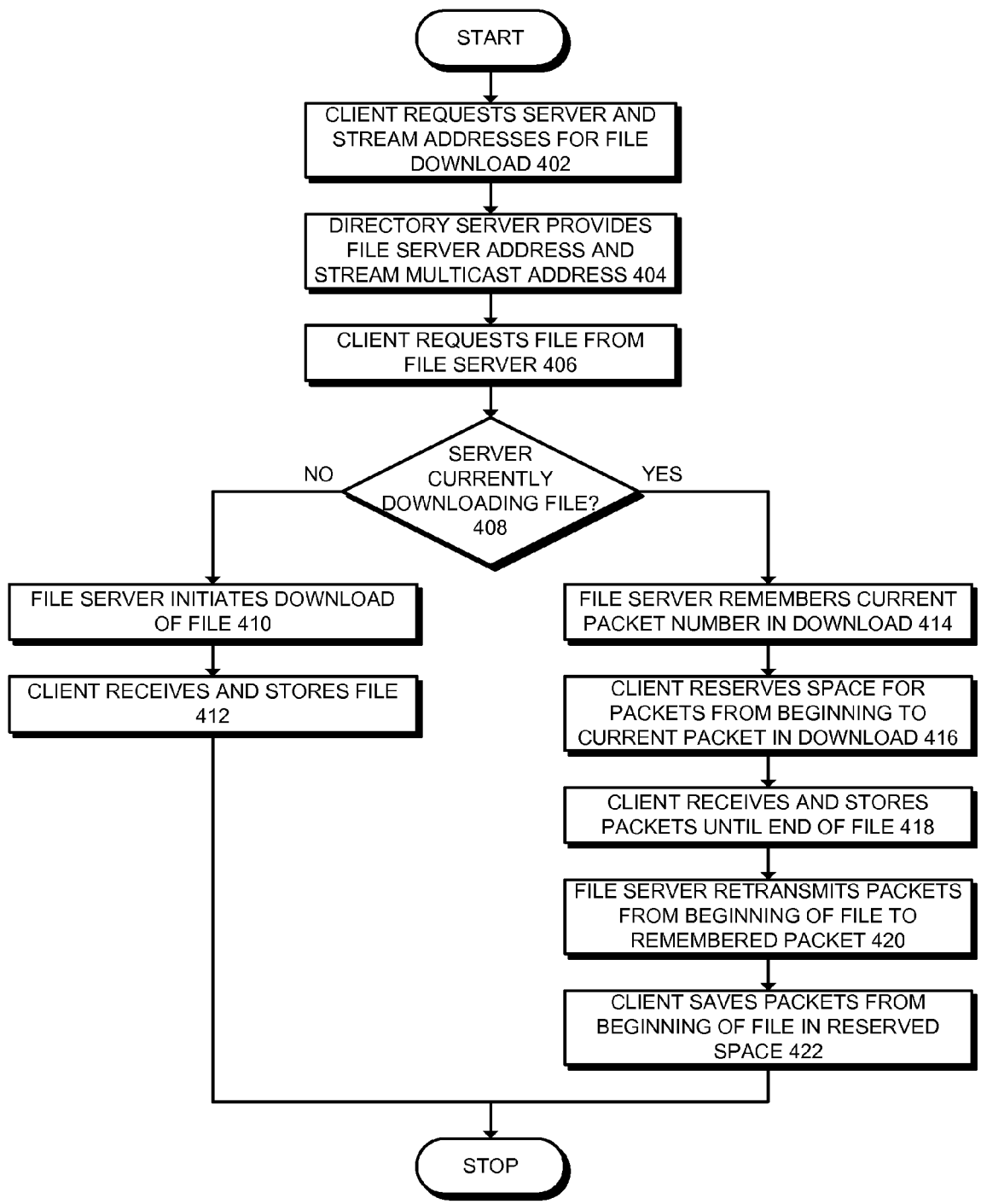
FIG. 4 is a flowchart illustrating the process of downloading a file stream from a server to a client in accordance with an embodiment of the present invention.

FIG. 4 is a flowchart illustrating the process of downloading a file stream from a server to a client in accordance with an embodiment of the present invention. The system starts when a client, for example client 110, requests file server and file stream addresses from directory server 104 for a file download (step 402). In response to this request, directory server 104 provides the file server address and the stream multicast address for the requested file (step 404). Client 110 then requests the file from file server 102 (step 406). The system then determines if file server 102 is currently downloading the file (step 408).

If file server 102 is not currently downloading the file, file server 102 initiates a download of the file in a multicast file stream (step 410). Client 110 receives and stores the file (step 412). Note that client 110 can ask for a retry on a missing packet as described above.

If file server 102 is currently downloading the file, file server 102 remembers the current packet number in the download file stream (step 414). Client 110 reserves space for the packets from the beginning of the file to the current packet in the download stream (step 416). Client 110 then receives and stores packet until the end of file is reached (step 418). File server 102 then retransmits packets from the beginning of the file to the remembered packet (step 420). Client 110 saves these retransmitted packets from the beginning of the file in the space reserved in step 416 (step 422). Note that client 110 can ask for a retry on a missing packet as described above.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for distributing files across a network, comprising:
   receiving a request at a file server to download a file to a client;
   determining whether the file server is currently downloading the file in a file download stream to another client;
   responsive to the file server not being currently downloading the file to another client, servicing the request by commencing the file download stream on a multicast port; and
   responsive to the file server being currently downloading the file, servicing the request by,
      remembering a marked location in the file, wherein the marked location in the file relates to a current packet number of the file download stream on the multicast port,
      reserving, at the client, a space in a local file for previously transmitted portions of the file from the beginning of the file to the current packet in the file download stream;
      continuing to download the file into the local file until an end of the file, thereby allowing the client to receive the remainder of the file, and
      downloading the file from the beginning of the file to the marked location, thereby allowing the client to receive previously transmitted portions of the file.

2. The method of claim 1, wherein if the file server receives an additional request from a second client to download the file the method further comprises:
   updating the marked location in the file to the current packet number in the download stream;
   continuing to download the file until the end of the file, thereby allowing the second client to receive the remainder of the file; and
   downloading the file from the beginning of the file to the marked location, thereby allowing the second client to receive previously transmitted portions of the file.

3. The method of claim 1, further comprising:
   receiving at the file server a notice from the client that a specified packet was not received; and
   inserting the specified packet into the download stream.

4. The method of claim 3, wherein if notices are received from multiple clients that the specified packet was not received, inserting the specified packet into the download stream only once to satisfy the notices.

5. A method for receiving files across a network, comprising:
   sending a request from a client to a directory server for a network address for a file server;
   receiving at the client an address for the file server and a multicast address for a file stream;
   requesting a download of a file from the file server;
   determining whether the file server is currently downloading the file in a file download stream to another client;
   responsive to the file server being currently downloading the file to another client, reserving a space in a local file for previously transmitted portions of the file from a first packet in the file up to a first received packet in the file download stream;
   receiving the remainder of the file from the file download stream at the multicast address into the local file;
   remembering a number for a first received packet which is not a first packet in the file download stream; and
   when an end of the file stream is reached, continuing to receive and store previously transmitted portions of the file from the first packet in the file up to the first received packet, into the reserved space in the local file.

6. The method of claim 5, wherein if a missing packet is detected in the file stream, the method further comprises:
   sending a retry request to the file server to resend the missing packet;
   monitoring the file stream for the missing packet; and if the missing packet is received, storing the missing packet in the local file, otherwise, resending the retry request to the file server after a specified period of time has elapsed.

7. A computer-readable storage medium storing instructions that when executed by a computer cause the computer to perform a method for distributing files across a network, the method comprising:

receiving a request at a file server to download a file to a client;

determining whether the file server is currently downloading the file in a file download stream to another client;

responsive to the file server not being currently downloading the file to another client, servicing the request by commencing the file download stream on a multicast port; and responsive to the file server being currently downloading the file to another client, servicing the request by:

remembering a marked location in the file, wherein the marked location in the file relates to a current packet number of the file download stream on the multicast port, reserving, at the client, a space in a local file for previously transmitted portions of the file from the beginning of the file to the current packet in the file download stream;

continuing to download the file until an end of the file, thereby allowing the client to receive the remainder of the file, and downloading the file from the beginning of the file to the marked location, thereby allowing the client to receive previously transmitted portions of the file.

8. The computer-readable storage medium of claim 7, wherein if the file server receives an additional request from a second client to download the file the method further comprises:

updating the marked location in the file to the current packet number in the download stream;

continuing to download the file until the end of the file, thereby allowing the second client to receive the remainder of the file; and downloading the file from the beginning of the file to the marked location, thereby allowing the second client to receive previously transmitted portions of the file.

9. The computer-readable storage medium of claim 7, the method further comprising:

receiving at the file server a notice from the client that a specified packet was not received; and inserting the specified packet into the download stream.

10. The computer-readable storage medium of claim 9, wherein if notices are received from multiple clients that the specified packet was not received, inserting the specified packet into the download stream only once to satisfy the notices.

11. A computer-readable storage medium storing instructions that when executed by a computer cause the computer to perform a method for receiving files across a network, the method comprising:

sending a request from a client to a directory server for a network address for a file server;

receiving at the client an address for the file server and a multicast address for a file stream;

requesting a download of a file from the file server;

determining whether the file server is currently downloading the file in a file download stream to another client;

responsive to the file server being currently downloading the file to another client, reserving a space in a local file for previously transmitted portions of the file from a first packet in the file up to a first received packet in the file download stream;

receiving the remainder of file from the file download stream at the multicast address into the local file;

remembering a number for a first received packet in the file stream; and when an end of the file stream is reached, continuing to receive and store previously transmitted portions of the file from the first packet in the file up to the first received packet, into the reserved space in the local file.

12. The computer-readable storage medium of claim 11, wherein if a missing packet is detected in the file stream, the method further comprises:

sending a retry request to the file server to resend the missing packet;

monitoring the file stream for the missing packet; and if the missing packet is received, storing the missing packet in the local file, otherwise, resending the retry request to the file server after a specified period of time has elapsed.

13. A computing device with a processor and a data storage resource for distributing files across a network, comprising:

a receiving mechanism that is configured to receive a request at a file server to download a file to a client;

a determination mechanism that is configured to determining whether the file server is currently downloading the file in a file download stream to another client;

a servicing mechanism that is configured to service the request by commencing the file download steam on a multicast port if the file server is not currently downloading the file; and responsive to the file server being currently downloading the file to another client, the servicing mechanism is further configured to service the request by:

remembering a marked location in the file, wherein the marked location in the file relates to a current packet number of the download stream on the multicast port, reserving, at the client, a storage space for packets from the beginning of the file to the current packet in the file download stream, continuing to download the file into the local file until an end of the file, thereby allowing the client to receive the remainder of the file, and downloading the file from the beginning of the file to the marked location, thereby allowing the client to receive previously transmitted portions of the file.

14. A computing device with a processor and a data storage resource of claim 13, further comprising:

an updating mechanism that is configured to update the marked location in the file to the current packet number in the download stream upon receiving an additional request from a second client to download the file;

wherein the servicing mechanism is further configured to continue to download the file until the end of the file, thereby allowing the second client to receive the remainder of the file; and wherein the servicing mechanism is further configured to download the file from the beginning of the file to the marked location, thereby allowing the second client to receive previously transmitted portions of the file.

15. A computing device with a processor and a data storage resource of claim 13, wherein the receiving mechanism is further configured to receive a notice at the file server from the client that a specified packet was not received; and further comprising an inserting mechanism that is configured to insert the specified packet into the download stream.

16. A computing device with a processor and a data storage resource of claim 15, wherein if notices are received from multiple clients that the specified packet was not received, the inserting mechanism is further configured to insert the specified packet into the download stream only once to satisfy the notices.

17. A computing device with a processor and a data storage resource for receiving files across a network, comprising:
- a sending mechanism that is configured to send a request from a client to a directory server for a network address for a file server;
- a receiving mechanism at the client that is configured to receive an address for the file server and a multicast address for a file stream;
- a requesting mechanism that is configured to request a download of a file from the file server;
- a determination mechanism that is configured to determining whether the file server is currently downloading the file in a file download stream to another client;
- a reserving mechanism that is configured to reserve a space in a local file for previously transmitted portions of the file from a first packet in the file up to a first received packet in the file download stream responsive to the file server being currently downloading the file to another client;
- a receiving and storing mechanism that is configured to receive and store the remainder of the file from the file download stream into the local file; and
- a remembering mechanism that is configured to remember a number for a first received packet in the file download stream; and
- wherein the receiving and storing mechanism is further configured to continuing to receive and store previously transmitted portions of the file from the first packet in the file up to the first received packet into the reserved space in the local file when an end of the file stream is reached.

18. A computing device with a processor and a data storage resource of claim 17, wherein if a missing packet is detected in the file stream, the apparatus further comprises:
- a retry mechanism that is configured to send a retry request to the file server to resend the missing packet;
- a monitoring mechanism that is configured to monitor the file stream for the missing packet;
- a storing mechanism that is configured to store the missing packet in the local file if the missing packet is received; and
- a resending mechanism that is configured to resend the retry request to the file server after a specified period of time has elapsed.

* * * * *

UNITED STATES PATENT AND TRADEMARK OFFICE
CERTIFICATE OF CORRECTION

| | | |
|---|---|---|
| PATENT NO. | : 7,627,653 B2 | Page 1 of 1 |
| APPLICATION NO. | : 11/959717 | |
| DATED | : December 1, 2009 | |
| INVENTOR(S) | : Taoyama et al. | |

It is certified that error appears in the above-identified patent and that said Letters Patent is hereby corrected as shown below:

In column 1, line 7, after "of" delete "a pending".

In column 3, line 26, delete "discs." and insert -- discs). --, therefor.

In column 10, line 15, in Claim 18, delete "the apparatus" and insert -- the computing device with a processor and a data storage resource --, therefor.

Signed and Sealed this
Eleventh Day of October, 2011

David J. Kappos
*Director of the United States Patent and Trademark Office*